United States Patent
Walter

[15] 3,660,741
[45] May 2, 1972

[54] GOVERNOR CONTROLLED FOOD MIXER

[72] Inventor: John Walter, Evergreen Park, Ill.
[73] Assignee: Sunbeam Corporation, Chicago, Ill.
[22] Filed: June 17, 1970
[21] Appl. No.: 47,003

[52] U.S. Cl. ..........................318/325, 259/1 A, 310/68, 200/80
[51] Int. Cl. ..............................................B01f 7/16
[58] Field of Search ............259/1 A; 318/325; 310/68; 200/80

[56] References Cited

UNITED STATES PATENTS

| | | | |
|---|---|---|---|
| 3,443,795 | 5/1969 | Gresens et al. | 259/1 A |
| 3,456,180 | 7/1969 | Athey et al. | 318/325 |
| 2,823,549 | 2/1958 | Buckman et al. | 318/325 X |

Primary Examiner—L. T. Hix
Assistant Examiner—Robert J. Hickey
Attorney—George R. Clark

[57] ABSTRACT

A lightweight, hand operated food mixer having a speed control which includes a mechanical governor for controlling the motor to any preselected speed. The speed control includes a manually operable cam and a switch which are mounted on a frame above the worm drive to the beater spindles. The switch, which includes a pair of starting contacts and governor controlled contacts, extends downwardly into proximity with the centrifugal element which is mounted on the forward end of the motor shaft. A beater ejector is mounted for reciprocating movement by the speed control shaft and straddles the cam for controlling the governor.

12 Claims, 8 Drawing Figures

Patented May 2, 1972
3,660,741
3 Sheets-Sheet 1
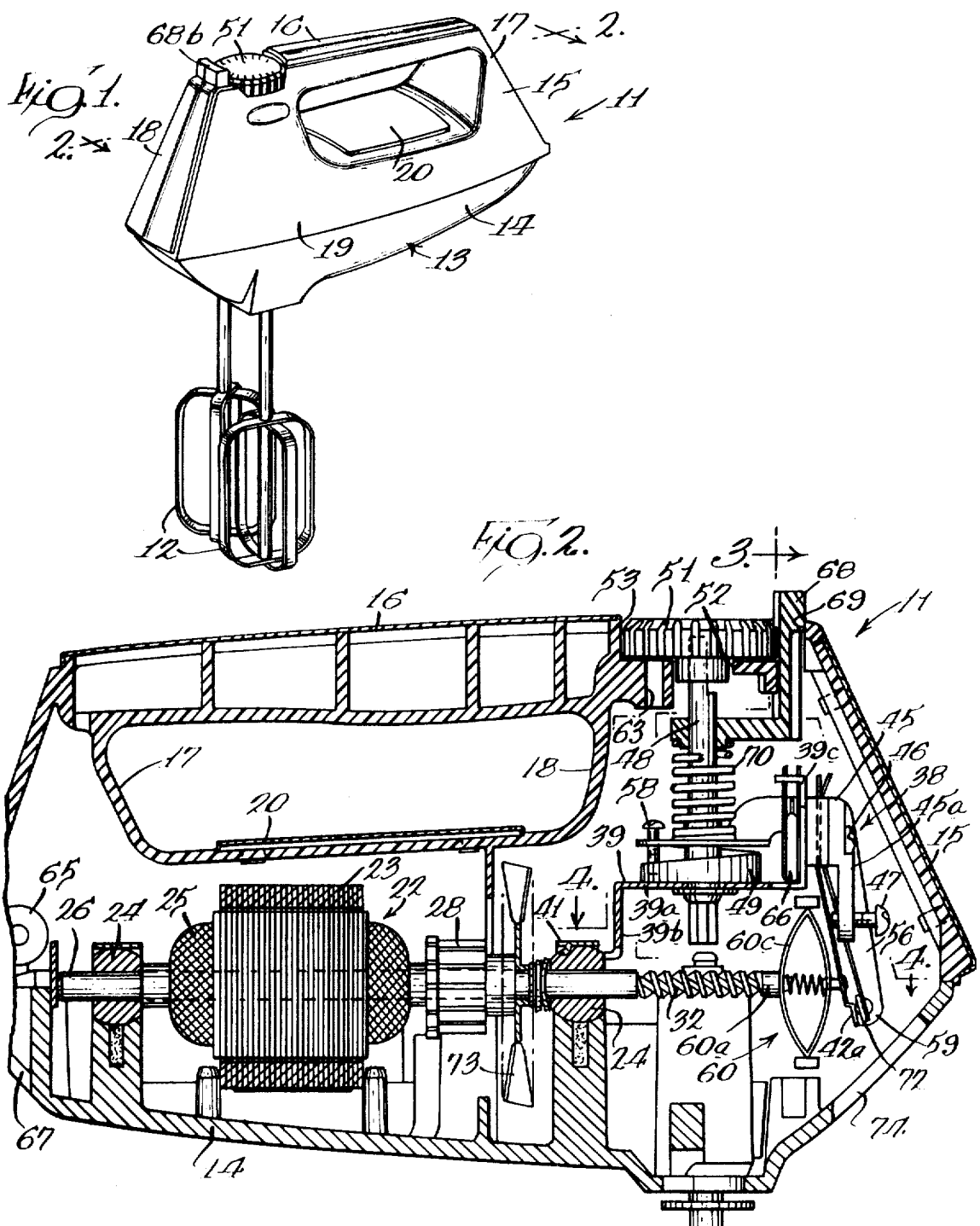
Inventor:
John Walter
By Neil M. Rose
Atty

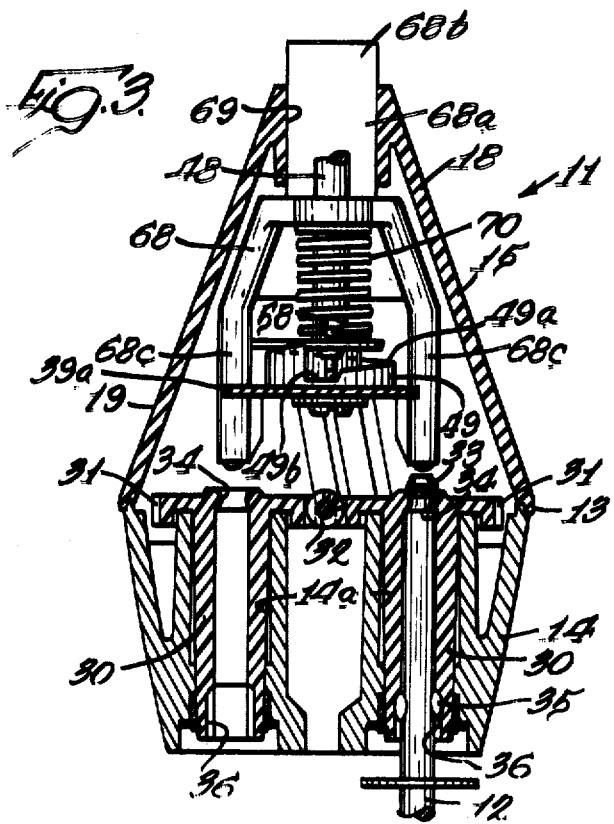
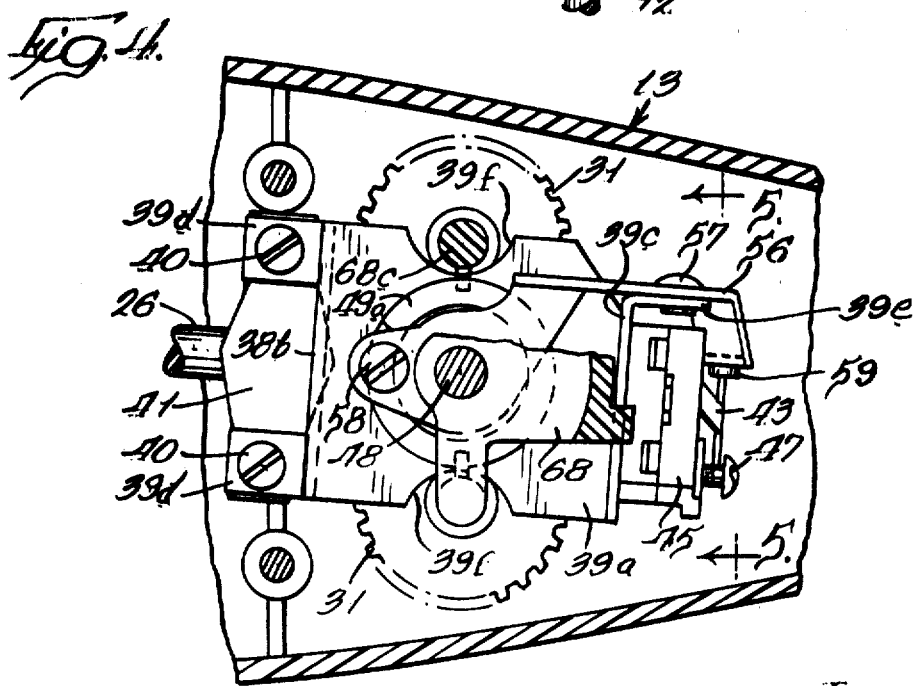

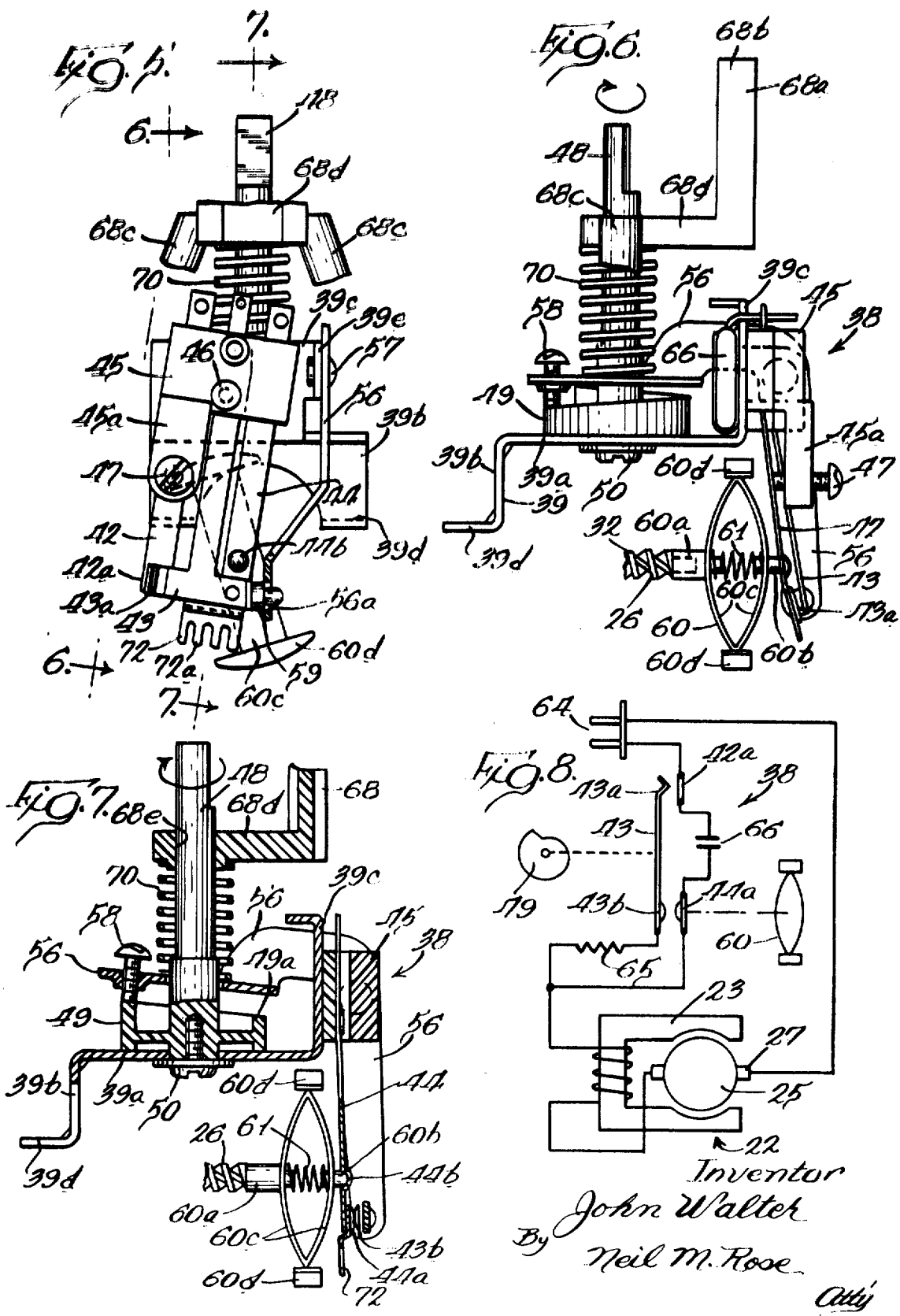

GOVERNOR CONTROLLED FOOD MIXER

BACKGROUND OF THE INVENTION

One of the most common household electric appliances is the electric food mixer. During the past 40 years in which its popularity has steadily increased, there have been substantial changes in the form of this appliance and the manner in which it has been used in the kitchen. While early food mixers stressed power and versatility, the increased use of prepared mixes and simplified recipes has substantially reduced the demands placed on the household food mixer. Accordingly, the light, hand operated electric mixer is becoming more and more significant and in many instances is completely replacing the large, stand supported mixers which were powerful enough to make bread, churn butter, and perform many tasks which are no longer of interest to the housewife.

There are, however, many features included in the large, stand supported mixers which heretofore have not been included in the hand mixer. It has been common to provide mechanical, centrifugally operated governors to control the speed of stand mixers. In connection with food mixing, it is extremely important and desirable to be able to accurately control the speed of the beaters. The efficiency and effectiveness of many mixing chores depends principally on how accurately the speed is controlled during the mixing operation. Accordingly, the large stand supported mixers have been characteristically provided with mechanical, centrifugal governors to assure operation of the beaters at the desired speed.

In the interests of saving costs and because of the space limitations, the hand mixer has characteristically been provided with a more simple, less satisfactory speed control than have the stand supported mixers. This speed control conventionally involves the use of a tapped motor field with a switch to selectively energize more or less of the field coils depending on the power or speed required. The problem with such an approach was the fact that it was impossible to get high power at slow speeds since the only way of decreasing the speed is to reduce the power. Accordingly, there has never been any question but that it would be preferable to provide a governor control on a hand mixer if it could be done economically and in a compact manner so as to avoid losing the lightweight and ease of manipulation which is characteristic of the hand mixer.

One of the reasons for the governor control in stand supported mixers adding considerably to the cost and bulk of the mixer is the manner in which it is positioned and integrated with the motor structure. Normally, the governor control is placed at the end of the armature shaft remote from the worm drive between the motor and the beater spindles. This arrangement frequently necessitates linkages extending between the manually operable speed control means at the front end of the mixer and the governor mechanism located at the back end of the mixer.

SUMMARY OF THE INVENTION

In order to overcome the shortcomings of the prior art and to provide a governor control for a small, compact hand mixer, the centrifugal or speed responsive element has been mounted at the forward end of the armature shaft at a point beyond the end of the worm drive to the beater spindles. The speed control and switch operated by the governor is mounted on a frame extending above the worm and beater spindles with the switch elements extending downwardly into proximity with the centrifugal responsive element carried by the armature shaft. The beater ejector is mounted with the speed control and switch on this frame to provide a compact assembly within the mixer housing and to provide a convenient arrangement for the controls extending externally of the housing.

Accordingly, it is an object of the present invention to provide an improved governor controlled hand mixer.

It is a further object of the present invention to provide a compact, lightweight mixer having the switch and speed control mechanism mounted at the front end of the housing.

It is another object of the present invention to provide a simple and effective beater ejector and speed control assembly which is mounted on a unitary frame within the forward portion of the mixer housing.

Still another object of the present invention is to provide an improved control assembly for a hand mixer wherein the beater ejector is guided for reciprocating movement by means of cooperating portions on the housing as well as on portions of the speed control shaft. A common spring urges the beater ejector to its retracted position and urges the speed setting lever against its associated control cam.

Still another object of the present invention is to provide a one piece molded plastic governor element which may be easily assembled to the armature shaft to control the supply of power to the motor in response to the speed thereof.

Further objects and advantages of the present invention will become apparent as the following description proceeds and the features of novelty which characterize the invention will be pointed out with particularity in the claims annexed to and forming a part of this specification.

BRIEF DESCRIPTION OF THE DRAWINGS

For a better understanding of the present invention, reference may be had to the accompanying drawings in which:

FIG. 1 is a perspective view of a portable food mixer embodying my invention;

FIG. 2 is an enlarged sectional view taken on line 2—2 of FIG. 1;

FIG. 3 is a vertical sectional view taken on line 3—3 of FIG. 2 assuming FIG. 2 shows the complete appliance;

FIG. 4 is an enlarged fragmentary sectional view taken on line 4—4 of FIG. 2;

FIG. 5 is a fragmentary sectional view of the beater ejector and speed control mechanism taken substantially on line 5—5 of FIG. 4;

FIG. 6 is a side elevational view of the beater ejector and speed control mechanism taken substantially on line 6—6 of FIG. 5;

FIG. 7 is a sectional view taken substantially along line 7—7 of FIG. 5; and

FIG. 8 is a schematic diagram of the circuit embodied in the mixer of FIGS. 1 through 7.

DESCRIPTION OF THE PREFERRED EMBODIMENT

Referring to the drawings, there is shown in FIG. 1 a lightweight, portable or hand operated food mixer designated generally by reference numeral 11. The hand mixer 11 includes the conventional beaters 12 which are detachably mounted on the front end of mixer housing 13 and depend therefrom in parallel spaced relation. The housing 13 includes a base or support 14 and a cover 15. The cover is provided with an integrally formed handle 16 which extends between a rear support column 17 and a front column 18. The cover is further defined by a peripheral skirt 19 and saddle portion 20 which form an enclosure over a motor 22 which is mounted on the base 14 within the housing 13. The base 14 is a phenolic member which serves not only as the decorative housing for the motor 22 but also serves as a frame to support the individual elements of the motor. The details of the motor supporting arrangement are more completely described in Chambers et al. U.S. Pat. No. 3,271,013 which is assigned to the same assignee as the instant invention. The phenolic base 14 serves to support motor field 23 and armature bearings 24 which journal armature 25 carried by shaft 26. Also supported on the base 14 are brushes 27 which are positioned in engagement with commutator 28.

At the forward end of the housing 13 the base 14 is formed with vertically extending horizontally spaced passageways 14a (FIG. 3) within which the beater spindles 30 are supported for rotary movement. The beater spindles 30 are formed at their upper ends with integral gears 31 which are positioned to mesh with a worm 32 formed on the outer end of the armature shaft 26. Thus, as the armature shaft 26 rotates turning the worm 32, the beater spindles 30 are caused to rotate by virtue of the engagement between the worm 32 and the gears 31.

For the purpose of retaining the beaters 12 in engagement with the spindles 30, each beater is provided a spring ring 33 which interferes with a shoulder 34 formed at the upper end of the spindle 30. The ring 33 permits the beaters 12 to be easily inserted and removed from the spindle 30 merely by applying an actual force either for assembly or disassembly. The beaters 12 are further provided with deformations 35 which cooperate with slots 36 to key the beaters 12 in driving relation to the beater spindles 30.

For the purpose of controlling the supply of electrical power to the motor 22, there is provided a switch 38 which is mounted within the housing 13 in the lower portion of the forward support column 18 by means of a support bracket 39. The bracket 39 is formed with a horizontal center or plate portion 39a, a rearwardly disposed mounting extension 39b, and a vertically extending switch support portion 39c. As is best shown in FIGS. 4 and 7, the mounting extension 39b is bifurcated having tabs 39d which are secured to the base 14 by screws 40 which serve the dual purpose of also fastening the bearing retainer 41 to the base 14.

The switch 38 which is secured to the switch support portion 39c includes three substantially parallel and downwardly extending switch blades 42, 43, and 44, as best shown in FIG. 5. The switch blades 42, 43, and 44 are riveted to an insulating switch block 45 which, in turn, is screwed to the switch support portion 39c by screw 46. Extending downwardly from the front edge of the switch block 45 is a projection 45a which carries at its lower end a calibration screw 47. As may be seen in FIGS. 2 or 6, the calibration screw 47 extends through the projection 45a into engagement with the switch blade 42. The lower end of the switch blade 42 is formed with a convex portion 42a and serves as one of the starting contacts.

The switch blade 43 is a somewhat inverted T-shaped element, as is obvious from FIG. 5. At either end of the cross bar of the T-shaped blade 43, there is provided an electrical contact. Opposite the starting contact 42a, there is formed a corresponding starting contact 43a on the switch blade 43. At the other end of the cross arm on blade 43 there is a contact 43b brazed or staked there. The contact 43b cooperates with another contact 44a carried by the lower end of switch blade 44.

In order to set the speed at which the contacts 43b and 44a are opened, there is provided a rotary speed control shaft 48 which is formed with an annular helical cam 49 at its lower end. The shaft 48 is mounted on the blade portion 39a of support bracket 39 by means of screw 50, as shown in FIG. 7. The shaft 48 and its associated cam 49 are secured sufficiently loosely to the plate portion 39a that they may be readily rotated by means of a control knob 51 which is received on and keyed to the upper end of the shaft 48. A suitable opening 52 in the top of the column 18 permits the shaft 48 to extend upwardly into a recess 53 within which the control knob 51 is received. As is evident from FIG. 1, the control knob is provided with suitable indicia to enable the user to set the control shaft 48 at the desired position. The knurled edges of the control knob 51 extend beyond the edges of the handle 16 thus permitting the knob to be adjusted easily by the thumb whether the mixer is used by a right handed or left handed person.

To interconnect the cam 49 with the switch 38, there is provided an L-shaped speed setting lever 56 which is pivotally mounted by means of a rivet 57 to a tab 39e (FIG. 4) formed on the edge of the switch support portion 39c. The end of the lever 56 adjacent cam 49 has mounted thereon a cam follower of adjustment screw 58. The other end of the lever 56 extends downwardly adjacent the lower end of blade 43 where it is formed with a slot 56a (FIG. 5) which receives the reduced end of a plastic coupling member 59. The coupling member 59 is merely pressed on a projection on the end of switch blade 43 and provides an insulating mechanical coupling between the blade 43 and the lever 56. Thus, as the cam 49 rotates, the lever 56 is caused to pivot about the mounting rivet 57 thereby causing the cross arm on switch blade 43 to be moved toward or away from the end of the armature shaft 26 and its associated worm 32.

Mounted on the forward end of the armature shaft 26 is the centrifugal or speed responsive element 60. Element 60 is a one piece, molded plastic part having a mounting hub 60a which is received on the end of the armature shaft 26 and an output hub 60b which is received on the end of the armature shaft 26 and an output hub 60b which engages a depression 44b in the switch blade 44. The mounting hub 60a and the output hub 60b are interconnected by the bowed, flexible arms 60c which, at their outer ends, support sector-shaped, integrally molded weights 60d. Positioned between the arms 60c is a spring 61 which is received on reduced extensions of the mounting hub 60a and the output hub 60b, as is evident from FIGS. 6 and 7. As the speed of rotation of the armature shaft 26 increases, the weights 60d on the element 60 tend to cause the bowed arms 60c to flatten out and extend more normal to the axis of the shaft 56. This action moves the output hub 60b inwardly toward the armature shaft 26 and causes the governor contacts 43b–44a to open. The precise speed at which the governor contacts open is determined by the setting of the cam 49 which, in turn, establishes the position of the lower end of switch blade 43. FIG. 6 is illustrative of a low speed position in which the governor contacts will open at a relatively low speed. FIG. 7, on the other hand, is illustrative of a high speed setting in which the armature shaft must rotate rapidly in order to deflect the arm 60c sufficiently to open the contacts 43b–44a. Any setting between these high and low settings are, of course, possible.

If it becomes necessary to adjust the calibration of the governor so that the control knob 51 will control to a higher or lower range of speeds, it is possible to accomplish this adjustment without removing the cover 15. The control knob 51 is frictionally retained on the upper end of the shaft 48 by means of a small internal spring and may be readily removed by applying an upward force on the projecting edges of knob 51. Within the recess 53, there is a vertically extending opening 63 which allows a screwdriver to be inserted for adjusting the screw 58. If the screw 58 is loosened or turned counterclockwise as viewed from the top, the mixer 11 will operate at a corresponding lower speed range. Such calibration means is necessary since the actual speed range depends on the relative positioning of a number of parts including the cam 49, the switch 38, and the governor element 60. The screw 58 and the housing opening 63 provide a simple means for calibrating or adjusting the speed control after the mixer is assembled. If desired, an opening may be provided in the knob 51 beneath a decorative escutcheon so that the speed adjustment or calibration may be accomplished by inserting the screwdriver through the aligned knob opening and the housing opening 63 into engagement with screw 58.

Referring to FIG. 8 of the drawings, there is shown a schematic wiring diagram of the motor and switch elements described above. The switch 38 is shown as connected in series with the motor 22 across a pair of power terminals 64. The terminals 64 are connected to a source of electrical power by means of a suitable power cord. The motor 22 is a series motor which may be operated on either alternating or direct current. As shown in FIG. 8, the starting contacts 42a–43a as well as the governor controlled contacts 44a and 43b are shown in their open circuit position. When the contacts are in the position shown in FIG. 8, the cam 49 is positioned as shown in FIG. 3 with the cam follower screw 58 engaged with a depression 49b. In this position, the lever 56 is pivoted counterclockwise, as viewed in FIG. 6, sufficiently to disengage both sets of contacts. When the control knob 48 is rotated to cause the cam follower screw 58 to move out of the recess 49b onto the sloped cam surface 49a, the contacts 43a and 42a are closed as are the contacts 44a and 43b.

As soon as the motor begins to rotate, the governor element 60 will be deflected to some extent. When the element 50 is rotated at sufficient speed to straighten out the bowed legs 60c, the switch blade 44 will deflect to the left, as viewed in FIGS. 6 and 7, thereby opening the governor contacts. With the governor contacts closed, the full line current passes through both sets of contacts to the motor 22. When the increasing speed results in the governor element 60 opening the contacts 44a–43b, the line current passes through a series resistor 65 and then to the motor 22. The series resistor 65 reduces the current to the motor 22 and causes the motor to slow down. It should be understood that the governor element 60 affects only the switch blade 44 and its associated contact 44a. The starting contact 42a and 43a, therefore, remain engaged throughout the operation of the mixer over the entire speed range. Referring to FIG. 2, it is noted that the resistor 65 is mounted at the back of the mixer housing 13 where cooling slots 67 permit air to be drawn into the housing to cool both the resistor 65 and the motor 22. A condensor 66 mounted against but insulated from the switch support portion 39c is connected in parallel with the governor contacts in order to minimize arcing in the contacts as they are opened and closed in maintaining the desired speed.

To provide for convenient removal of the beaters 12, there is included within the housing 13 an inverted, Y-shaped beater ejector 68. At its upper end, the ejector 68 is formed with a column-like portion 68a which is generally rectangular in cross section and extends upwardly through an opening 69 in the cover 15. The portion 68a terminates in a manually operable button 68b which is positioned immediately in front of the control knob 51, as is best shown in FIG. 1. The rear face of portion 68a and button 68b has a cylindrical curvature corresponding to the knob 51 so that the knob 51 and the button 68b are immediately adjacent each other for ease of operation by the thumb of the user. The beater ejector 68 is further provided with a pair of downwardly extending spaced parallel legs 68c (FIG. 3). The legs 68c and the portion 68a are interconnected by a horizontally disposed leg 68d which is formed with a hole 68e at one end through which the shaft 48 extends (see FIG. 6). Clearance notches 39f are formed in the support bracket 39 to permit the legs 68c to extend downwardly into engagement with the tops of the beaters 12. As is evident from FIG. 3, the beaters 12 extend through the spindles 30 and protrude upwardly where they are subject to engagement by the lower ends of the beater ejector legs 68c. Thus, by applying a downwardly force on the ejector button 68b, the beater ejector 68 is forced downwardly into engagement with the tops of the beaters 12. A small, downward pressure overcomes the resistance provided by the spring rings 33 causing the beaters 12 to be disengaged downwardly out of the spindles 30. The opening 69 in the cover 15 as well as the engagement between hole 68e and shaft 48 locates and guides the beater ejector 68 in its downward movement into engagement with the tops of the beaters 12.

A coil spring 70 is received around the speed control shaft 58 with the the upper end thereof engaged with the horizontal leg 68d of the beater ejector 68 and the lower end engages with a portion of lever 56 which surrounds the shaft 48. The spring 70 serves the dual purpose of urging the beater ejector 68 upwardly out of engagement with the beaters 12 and also applies a downward pressure against the lever 56 forcing the cam follower screw 58 into proper seated engagement with the annular cam surface 49a. The support bracket 39 and its associated speed control shaft 48 serve to support both the beater ejector 68 and the governor controlled switch 38. This assembly is mounted in a compact fashion over the worm and spindle gears with the controls extending upwardly into a position convenient for operation by the thumb of the user while the switch blades extend downwardly from the support bracket 39 to a position adjacent the governor element 60 mounted on the worm end of the shaft 26. The resulting ejector, switch, and governor occupy little more space than is conventionally available in this area of a hand mixer. Accordingly, the advantages of governor operation are achieved with little or no increase in size of the mixer.

There is normally a considerable amount of heat generated at the governor contacts 43b and 44a as a consequence of frequent cycling to maintain the desired motor speed. In order to dissipate the heat generated at the contacts 43b–44a, a finned heat dissipating member 72 is attached to the lower end of switch blade 44 and is formed with a plurality of heat dissipating fingers 72a (FIG. 5).

As was mentioned above, the rear end of the housing 13 is formed with air circulating slots 67 through which cooling air is drawn by the motor 22. Mounted on the armature shaft 26 is a bladed fan 73 which draws air in through the slots 67 and discharges the air through forwardly located slots 74. The air thus circulated by the fan 73 passes over the resistor 65 through the motor 22 across the contacts of switch 38 and is discharged forwardly and downwardly through the openings 74. This arrangement provides maximum cooling of the governor contacts while maintaining the compact shape of the housing 13. By discharging the air outwardly through the front openings 74, the possibility of any batter, flour, or the like entering into the housing 13 is minimized.

While there has been shown and described a particular embodiment of the present invention, it will be apparent to those skilled in the art that various changes and modifications may be made without departing from the invention in its broader aspects, and it is, therefore, contemplated in the appended claims to cover all such changes and modifications as fall within the true spirit and scope of the present invention.

What is claimed as new and desired to be secured by Letters Patent of the United States is:

1. In a food mixer of the type having a housing enclosing a motor with a horizontally disposed armature shaft, said shaft having a worm which drivingly engages gears on each of two spaced beater spindles, an improved speed control and beater ejector comprising a unitary frame mounted within said housing and positioned in overlying spaced relation to said worm, a manual speed control journalled on said frame with one end extending outside of said housing for manual actuation and the other end being formed with a cam, a switch connected in circuit with said motor and being mounted on said frame, said switch includes a first pair of starting contacts and a pair of governor controlled contacts, said first contacts connecting a resistor in circuit with said motor, said second contacts shorting out said resistance when closed, speed responsive means carried on the end of said shaft adjacent to said worm to open and close said second pair of contacts, and a speed setting lever pivoted to said frame and interconnecting said cam and said second contacts whereby said manual speed control may be manually adjusted to establish the motor speed at which said second contacts will open and close, said frame including said switch and lever and said speed control forming a unitary assembly mounted within said housing with said switch in engagement with said speed responsive means.

2. The food mixer of claim 1 including a beater ejector member supported by said frame, said speed control being journalled on said frame for rotation about an axis perpendicular to said armature shaft.

3. The food mixer of claim 2 wherein said speed control and said beater ejector are provided with manual control portions positioned immediately adjacent to each other on the upper forward portion of said housing, said speed control and beater ejector extend through spaced openings in said housing, said beater ejector being guided for reciprocating movement by one of said openings and by guide means on said speed control engaging said ejector.

4. A governor controlled mixer comprising an elongated housing enclosing a motor having an armature shaft extending lengthwise thereon, a pair of beater spindles at one end of said housing each having a gear formed thereon and positioned in horizontally spaced relation, a worm on said shaft positioned between said spindles in driving connection with said spindle gears, a one piece molded plastic governor member supported on the end of said shaft adjacent said worm, said member including two bowed plastic arms connected at their ends and having mounting and output hubs at their midpoints, integrally molded plastic weights positioned at the ends of said arms, a switch carried by a bracket overlying said worm and spindles, said switch extending downwardly into engagement with said governor member, said governor member including a spring positioned between said bowed plastic arms for biasing said output hub against said switch.

5. The governor controlled mixer of claim 4 wherein said switch includes a plurality of flexible switch blades rigidly supported on one end at said bracket and having contacts on their lower free ends, one of said blades engaging said output hub of said governor member, a second one of said blades having a contact in engagement with the contact on said one blade, and a speed setting lever pivotally mounted on said bracket and connected to said second blade to adjustably position the contact thereon with respect to said governor member.

6. The governor controlled mixer of claim 5 having a manually adjustable speed control rotatably supported on said bracket and having a cam connected thereto, said cam adjustably positioning said speed setting lever.

7. The governor controlled mixer of claim 6 having a beater ejector member mounted for reciprocating vertical movement, said beater ejector member being guided in such movement by engagement with said housing and said speed control, and a helical spring on said speed control biasing said beater ejector member upwardly and said lever downwardly against said cam.

8. A governor controlled mixer comprising an elongated housing enclosing a motor having an armature shaft extending lengthwise thereon, a pair of beater spindles at one end of said housing each having a gear formed thereon and positioned in horizontally spaced relation, a worm on said shaft positioned between said spindles in driving connection with said spindle gears, a one piece molded plastic governor member supported on the end of said shaft adjacent said worm, said member including two bowed plastic arms connected at their ends and having mounting and output hubs at their midpoints, integrally molded plastic weights positioned at the ends of said arms, a switch carried by a bracket overlying said worm and spindles, said switch extending downwardly into engagement with said governor member, said bracket supporting a speed control shaft extending vertically and being journalled at its lower end on said bracket, said shaft having a circular helical cam mounted thereon adjacent said bracket and a manually adjustable knob at its upper end, and a beater ejector member having spaced legs straddling said bracket and positioned to engage the upper ends of said beaters received in said spindles, said beater ejector member having a central portion received on said shaft to guide said beater ejector member for vertical reciprocating movement.

9. A hand operated food mixer comprising a housing formed by a supporting base and a cover, a motor enclosed in said housing and having an armature shaft extending horizontally lengthwise of said housing, a worm on one end of said shaft engaging a pair of gears one positioned on either side of said worm, each said gear driving a beater spindle supported on said base, governor means carried by the end of said shaft adjacent said worm, said governor means being responsive to the speed of rotation of said shaft, a frame mounted in said housing and extending above said worm, a reciprocating beater ejector and rotatable speed control mounted on said frame above said worm, a switch mounted on said frame and connected in series with said motor, said switch having contacts which are opened and closed by said governor means, and a cam on said speed control connected to said contacts by a lever to vary the speed at which said contacts are opened and closed.

10. The food mixer of claim 9 wherein said frame includes a horizontal plate portion in which said speed control is journalled, said cam being integral with said control and rotating on said plate portion with an upwardly facing annular cam surface, said lever being pivotally mounted on said frame with one end engaging said cam surface and the other end connected to position one of said switch contacts.

11. The food mixer of claim 10 wherein said beater ejector is supported for vertical reciprocating movement by said cover and by said speed control.

12. The food mixer of claim 9 wherein said switch includes three substantially parallel downwardly extending flexible blades supported on said frame by insulating material, one of said blades having two contacts provided thereon and being movable toward and away from said armature shaft by said speed control and lever, said governor means engaging other of said blades which has a contact normally biased out of engagement with one of said two contacts, said governor means deflecting said other blade to close one of said two contacts on said one blade and the contact on said other blade, the third blade having a contact which cooperates with the remaining contact on said one blade to form a starting switch.

* * * * *